(12) United States Patent
Eastes

(10) Patent No.: US 12,216,066 B2
(45) Date of Patent: *Feb. 4, 2025

(54) FLEXIBLE AND/OR DEFORMABLE MECHANICAL ELEMENTS WITH RADIOGRAPHIC MARKERS

(71) Applicant: Science Applications International Corporation, Reston, VA (US)

(72) Inventor: Theodore W. Eastes, Monterey Park, CA (US)

(73) Assignee: Science Applications International Corporation, Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/374,024

(22) Filed: Sep. 28, 2023

(65) Prior Publication Data

US 2024/0288384 A1 Aug. 29, 2024

Related U.S. Application Data

(63) Continuation of application No. 17/402,339, filed on Aug. 13, 2021, now Pat. No. 11,808,716.

(51) Int. Cl.
*G01N 23/04* (2018.01)
*F16J 15/3284* (2016.01)
*G01N 23/083* (2018.01)

(52) U.S. Cl.
CPC .......... *G01N 23/04* (2013.01); *F16J 15/3284* (2013.01); *G01N 23/083* (2013.01); *G01N 2223/629* (2013.01)

(58) Field of Classification Search
None
See application file for complete search history.

(56) References Cited

U.S. PATENT DOCUMENTS

| | | | |
|---|---|---|---|
| 7,998,180 B2 | 8/2011 | Erickson et al. | |
| 9,345,597 B2 | 5/2016 | Pacetti | |
| 9,370,388 B2 | 6/2016 | Globerman et al. | |
| 9,534,889 B2 | 1/2017 | Kim et al. | |
| 9,675,453 B2 | 6/2017 | Guttenberg et al. | |
| 11,808,716 B2 * | 11/2023 | Eastes | F16J 15/064 |
| 11,927,548 B2 | 3/2024 | Eastes | |
| 2006/0067465 A1 | 3/2006 | Wilson | |

(Continued)

OTHER PUBLICATIONS

Harara, "Digital Radiography in Industry," 17th World Conference on Nondestructive Testing, Oct. 25-28, 2008, Shanghai, China, downloaded Mar. 17, 2021 from <<http://citeseerx.ist.psu.edu/viewdoc/download?doi=10.1.1.216.4675&rep=rep1&type=pdf>>, 6 pages.

(Continued)

*Primary Examiner* — David P Porta
*Assistant Examiner* — Mamadou Faye
(74) *Attorney, Agent, or Firm* — Banner & Witcoff, Ltd.

(57) ABSTRACT

A flexible and/or deformable mechanical element may comprise one or more radiographic markers. The one or more radiographic markers may have a radiopacity greater than a radiopacity of a parent material forming a body of the mechanical element. A radiographic image of a portion of an assembly into which the mechanical element has been installed may include a representation of the one or more radiographic markers that indicates a condition of the mechanical element.

20 Claims, 11 Drawing Sheets

(56) References Cited

U.S. PATENT DOCUMENTS

| | | | |
|---|---|---|---|
| 2006/0108545 | A1 | 5/2006 | Yoshiki et al. |
| 2008/0021313 | A1 | 1/2008 | Eidenschink et al. |
| 2009/0022272 | A1 | 1/2009 | Joseph et al. |
| 2010/0091951 | A1 | 4/2010 | Ngo |
| 2015/0314047 | A1 | 11/2015 | Lin et al. |
| 2018/0120246 | A1 | 5/2018 | Baucke et al. |
| 2018/0256231 | A1 | 9/2018 | Globerman et al. |
| 2020/0197121 | A1 | 6/2020 | Morey et al. |
| 2022/0414863 | A1 | 12/2022 | Bovero et al. |

OTHER PUBLICATIONS

Mc-Master-Carr®, Rotary Shaft Seals, <<https://www.mcmaster.com/seals/dynamic-seals/>>, downloaded Mar. 19, 2021, 22 pages.

Chvartszaid, "Radiographic Journey Through Implant Treatment," Radiographic Journey Through Implant Treatment—Oral Health Group, <<https://www.oralhealthgroup.com/features/radiographic-journey-through-implant-treatment/>>, downloaded Dec. 4, 2020, 9 pages.

Sigakis, et al., "Radiographic Review of Current Therapeutic and Monitoring Devices in the Chest," RadioGraphics, vol. 38, No. 4, <<https://pubs.rsna.org/doi/full/10.1148/rg.2018170096>>, downloaded Dec. 4, 2020, 31 pages.

Hassebrook, "Composite Correlation Filter for O-ring Detection in Stationary Colored Noise," Proc. SPIE 7340, Optical Pattern Recognition XX, 734007 https://doi.org/10.1117/12.819437, downloaded Dec. 4, 2020 from <<https://www.researchgate.net/profile/Laurence_Hassebrook/publication/252804576_Composite_correlation_filter_for_O-ring_detection_in_stationary_colored_Noise/links/544006f60cf2b21758cff777/Composite-correlation-filter-for-O-ring-detection-in-stationary-colored-noise.pdf>>, 8 pages.

Wikipedia entry for "O-ring," downloaded Mar. 28, 2021, <<https://en.wikipedia.org/wiki/O-ring>>, 9 pages.

Rathi Transpower Private Limited, "Causes of Coupling Failures," prior to Jul. 13, 2021, 6 pages.

"Understanding Diaphragm Failures," prior to Jul. 13, 2021, 6 pages.

* cited by examiner

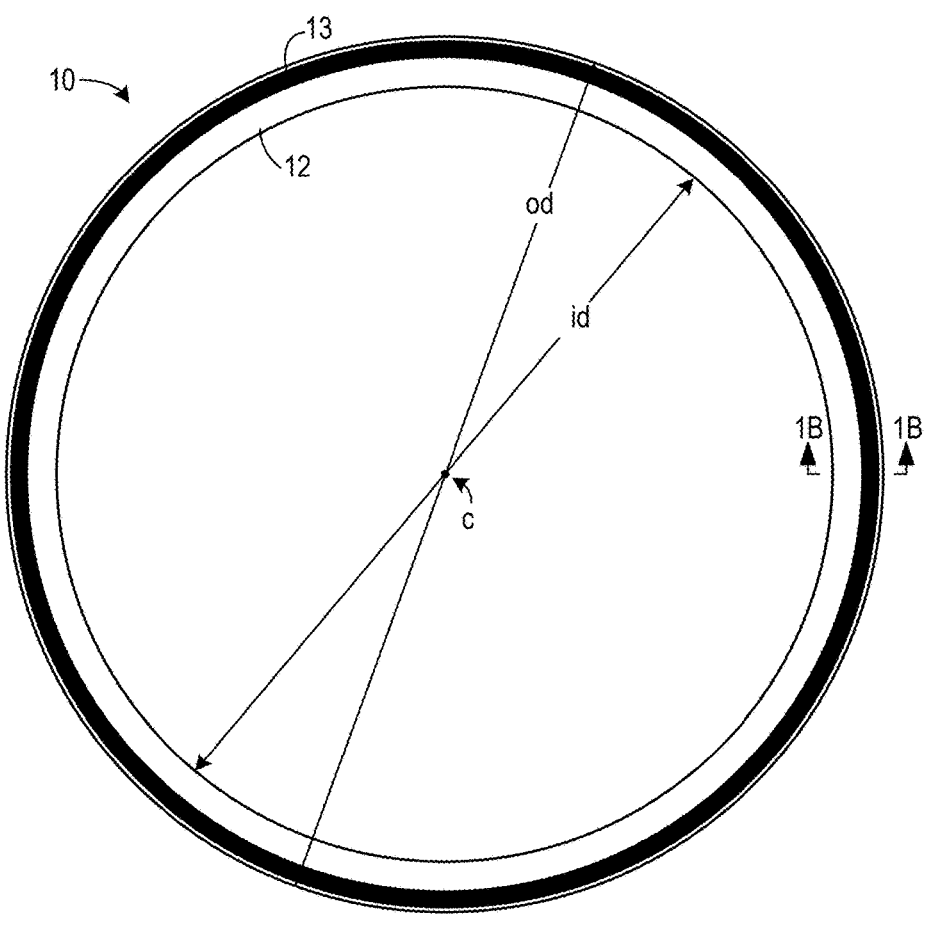
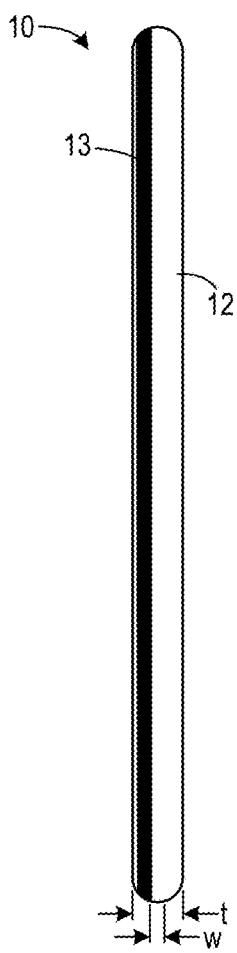
FIG. 1A
FIG. 1C
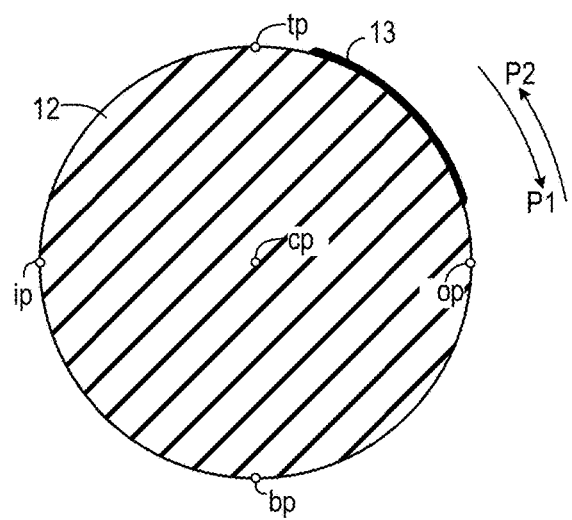
FIG. 1B

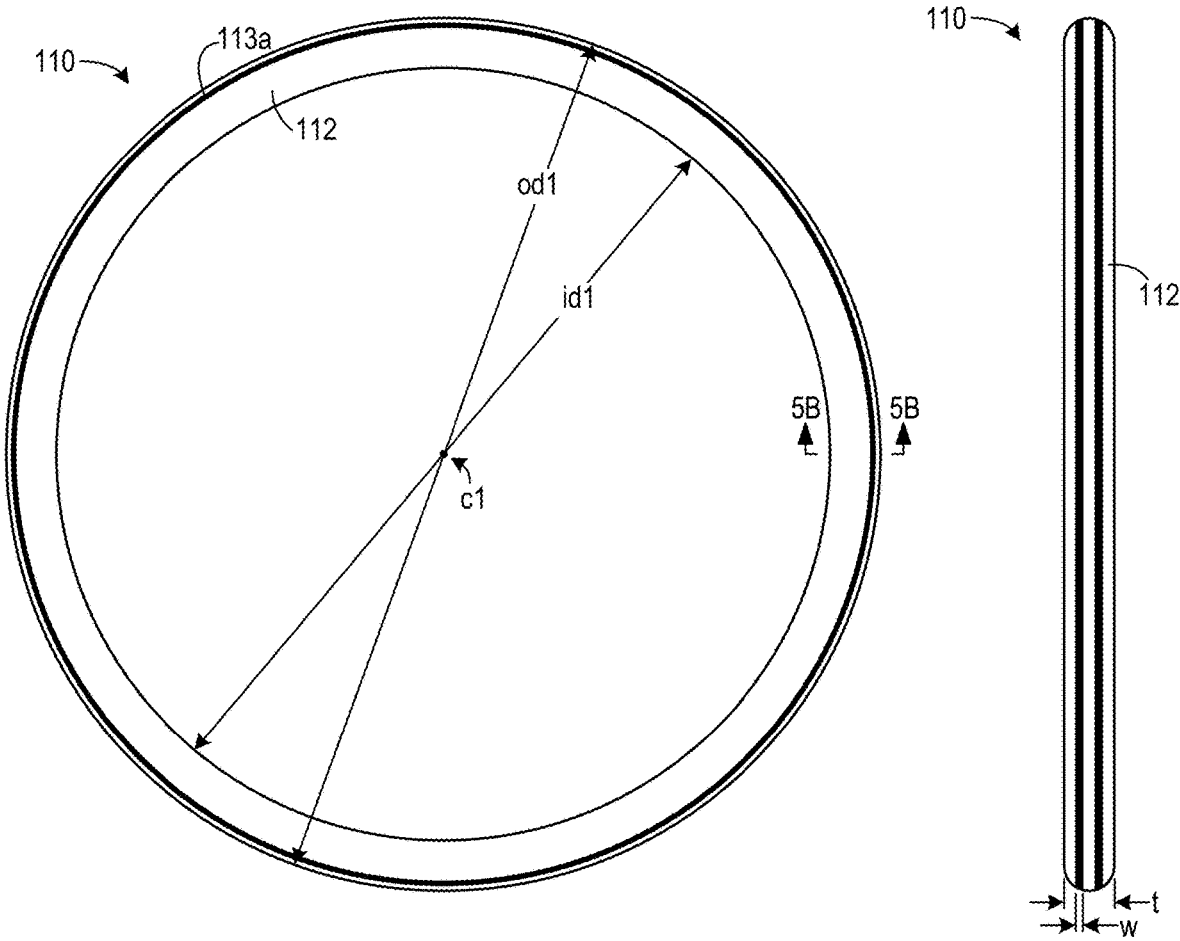
FIG. 5A
FIG. 5C
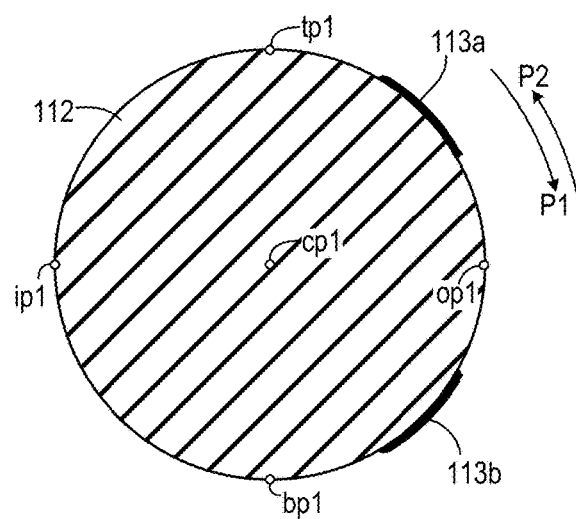
FIG. 5B

Flexible and/or Deformable Mechanical Elements with Radiographic Markers

CROSS REFERENCE TO RELATED APPLICATIONS

This application is a continuation of U.S. patent application Ser. No. 17/402,339, filed Aug. 13, 2021, entitled "Flexible and/or Deformable Mechanical Elements with Radiographic Markers," which application is entirely incorporated herein by reference.

BACKGROUND

Flexible and/or deformable mechanical elements are used in many applications and may take various forms. Examples of flexible and/or deformable elements may include seals, gaskets, diaphragms, bladders, mechanical couplers, bellows, springs, burst diaphragms, etc. Such mechanical elements may be incorporated into assemblies in which those elements are not readily visible. If a problem occurs with such an installed mechanical element, it may be necessary to disassemble one or more mechanical components to access the mechanical element. Such disassembly may be time-consuming and may damage or disturb the mechanical element from its as-installed configuration. The damage or disturbance caused by disassembly may make troubleshooting a problem more difficult.

SUMMARY

This Summary is provided to introduce a selection of some concepts in a simplified form as a prelude to the Detailed Description. This Summary is not intended to identify key or essential features.

A flexible and/or deformable mechanical element may have one or more radiographic markers. One or more materials used to form the one or more radiographic markers may have radiopacity to X-rays (and/or other types of radiographic energy emissions) that is greater than radiopacity of a material from which a body of the mechanical element is formed. The one or more radiographic markers may be located on an outer surface the body of the mechanical element and/or may be embedded in that body. After the mechanical element is installed in an assembly, one or more radiographic images may be created of a portion of the assembly that includes the mechanical element. One or more of those images may include a representation of the radiographic marker(s) that indicates a condition of the as-installed mechanical element.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

FIG. 1A is a top view of an example seal comprising a radiographic marker.

FIG. 1B is an enlarged, partially schematic area cross-sectional view of the seal of FIG. 1A.

FIG. 1C is a side view of the seal of FIG. 1A.

FIG. 5A is a top view of another example seal comprising radiographic markers.

FIG. 5B is an enlarged, partially schematic area cross-sectional view of the seal of FIG. 5A.

FIG. 5C is a side view of the seal of FIG. 5A.

DETAILED DESCRIPTION

Figure 2A:
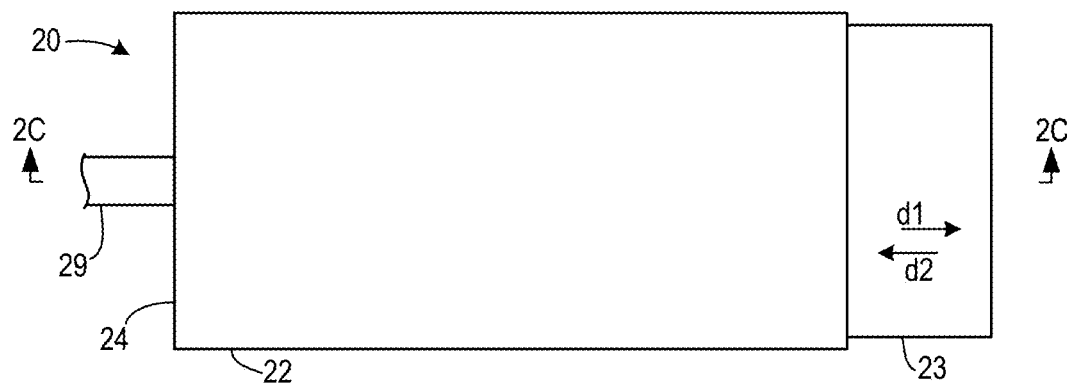
FIG. 2A is a side view of an example structure incorporating the seal of FIG. 1A.

Flexible and/or deformable mechanical elements are often employed in assemblies where their flexibility or deformation performs a critical function of that assembly. Due to their inherent flexibility and weak structural character, they are often the source of problems in the operation of the assembly. To assess a condition of a flexible and/or deformable mechanical element, one or more radiographic markers may be applied to (and/or otherwise incorporated into) the mechanical element. After the mechanical element is installed in an assembly, one or more radiographic images may be created of a portion of the assembly that includes the installed mechanical element. Such images may reveal, without necessitating dismantling the assembly for purposes of inspection, information about a condition of the mechanical element as installed. Examples of flexible and/or deformable mechanical elements that may include one or more radiographic markers may include, without limitation, a seal (e.g., an O-ring or gasket), a drive belt, a diaphragm, a bladder, a mechanical coupler, a bellows, a spring, a burst disc/diaphragm, etc. Examples of conditions that may be indicated by a radiographic marker of such a mechanical element include, without limitation, twisting, extrusion, and/or other deformation, dislocation, improper installation, and/or other position-related conditions, cutting, severing, separation, wear, and/or other conditions associated with damage to a mechanical element, and/or other conditions.

As indicated above, a seal is an example of a flexible and/or deformable mechanical element. Seals are mechanical components that may be used to create a fluid-tight connection (or other interface) between other mechanical components. For example, a seal may be positioned between parts of a mechanical assembly to prevent a fluid (e.g., a gas, a liquid, or a gas/liquid mixture) from passing through an interface between those two parts. Seals may be used in static and/or dynamic applications. In a static application, a seal may be located between a component (e.g., a lid or cap of a container) that is fixedly attached to another component (e.g., a portion of a container in which an opening is formed), and which does not move relative to that other component after attachment. In a dynamic application, a seal may be located at an interface between two moving components (e.g., between a wall of a cylindrical cavity and a wall of a piston moving within that cavity).

Seals may take a variety of forms. A well-known type of seal is a type of gasket that is commonly referred to as an O-ring. Conventionally, an O-ring may be a closed loop formed from an elastomeric material and which may have a toroidal shape when the loop is not folded or otherwise deformed. In use, an O-ring may be positioned in a gland (e.g., a channel) formed in a surface of a first part. After that first part and a second part are assembled, the second part may push against and compress the O-ring, with the O-ring thereby filling one or more gaps between the first and second parts through which a fluid might otherwise pass.

O-rings and various uses for O-rings are well known. There are well-developed engineering design criteria for selecting sizes of O-rings, for fabricating O-ring glands, and for selection of O-ring material. For these and other reasons, O-rings are widely used in a variety of static and dynamic applications. However, there are problems associated with O-ring use. In some cases, for example, a portion of an installed O-ring may roll. During such rolling, a part of the O-ring body may be twisted in a poloidal direction (e.g., about an axis perpendicular to a cross-section of the O-ring, as further described below). Rolling may twist and/or compress a portion of an O-ring, which may affect the ability of that portion to form an effective fluid barrier. Rolling may, for example, occur in dynamic applications as moving parts apply forces to opposite side surfaces of an O-ring.

Detecting rolling and other types of unwanted O-ring deformation may be difficult. After an O-ring is incorporated into assembled parts, it may not be visible. Disassembling the parts to inspect that O-ring may be time-consuming. In some cases, disassembly may even cause or allow a rolled O-ring to return to an unrolled condition, thereby making discovery of rolling more difficult.

Using a variety of known techniques, radiographic equipment may be used to inspect assembled parts to assess internal conditions that might otherwise not be visible from an external view of the assembled parts. Such equipment may often, though not exclusively, use x-rays. For example, digital radiographic inspection may comprise positioning an x-ray emitter on one side of a component and an x-ray sensor on an opposite side. X-rays from the emitter may pass through the component and be detected by pixels of the sensor. Because different materials within the component (and/or different thicknesses of components) may block and/or absorb different amounts of energy from x-rays, data from the pixels may be used to create an image that shows internal details of the component. Additional processes such as a computed tomography scanning may be used to combine data from multiple images and/or slices to reveal further internal details.

However, radiographic inspection techniques may be unable to detect rolling and/or other deformations and/or damage to conventional O-rings that have been installed inside an assembled structure. Distinguishing a conventional O-ring from other parts in an x-ray image may be difficult. Even if that O-ring can be distinguished from other parts, it may be very difficult to determine if a portion of that O-ring is rolled, twisted, torn, extruded from a gland, or otherwise not in an intended condition. For similar reasons, it may be difficult to distinguish other types of flexible and/or deformable mechanical elements in radiographic images of assembled structures that incorporate those flexible and/or deformable mechanical elements.

To increase visibility of an O-ring or other mechanical element during a radiographic inspection, one or more radiographic markers may be added to that mechanical element. The radiographic marker(s) may be formed from one or more materials that absorb x-rays at a higher rate than a parent material of a body of the mechanical element and/or at a higher rate than material(s) that form assembled components (e.g., a housing and/or surrounding hardware) of a structure that incorporates the mechanical element. This may allow the radiographic marker(s) to be visible in a radiographic image and may facilitate inspection of the mechanical element without disassembly of the structure. For convenience, the characteristic of a material to absorb or otherwise block passage of x-rays (or other radiation used for radiographic imaging) may be referred to as radiopacity. A material with a higher radiopacity will absorb (and/or block) more of such radiation than a material with a lower radiopacity. Radiopacities are known and/or calculable for a wide variety of materials.

FIG. 1A is a top view of an example seal 10 comprising a radiographic marker. The example seal 10 may be an O-ring and may comprise a cord 12, forming a body of the seal, and a radiographic marker 13. The cord 12 may be formed from a polymeric parent material (e.g., an elastomeric material) and may be shaped into a continuous loop. The cord 12 may be cut from a longer section of cord material and may be shaped into a continuous loop by bonding ends of the cord 12 together. Alternatively, the cord 12 may be molded or otherwise formed as continuous loop. As shown in FIG. 1A, the seal 10 may have a circular shape when in a laid-flat configuration in which the cord 12 is evenly displaced, without deformation, from a center c. In the laid-flat configuration, the seal 10 may have an inner diameter id and an outer diameter od.

FIG. 1B is an enlarged, partially schematic area cross-sectional view of the seal 10 taken from the location indicated in FIG. 1A. As shown in FIG. 1B, the cord 12 may have a circular cross-section, thereby giving the seal 10 a toroid shape in the laid-flat configuration. Various perimeter paths may be selected on the cord 12. An inner perimeter ip may correspond to the inner diameter id and may extend, when the seal 10 is in the laid-flat configuration, in a path around the innermost portion of an outer surface of the cord 12. An outer perimeter op may correspond to the outer diameter od and may extend, when the seal 10 is in the laid-flat configuration, in a path around the outermost portion of the outer surface of the cord 12. A top perimeter tp may extend, when the seal 10 is in the laid-flat configuration, in a path around the topmost portion of the outer surface of the cord 12. A bottom perimeter bp may extend, when the seal 10 is in the laid-flat configuration, in a path around the bottommost portion of the outer surface of the cord 12. A center perimeter cp may extend, when the seal 10 is in the laid-flat configuration, in a path that passes through the centers of all cross-sections such as that of FIG. 1B. Although open dots are used in FIG. 1B to indicate locations of the top perimeter tp, the bottom perimeter bp, the inner perimeter ip, the outer perimeter op, and the center perimeter cp, those open dots are not intended to indicate (or exclude) the presence of inclusions or other physical structure that may be distinct from the material of the cord 12. In the example of the seal 10, a portion of an outer surface of the cord 12 (between the outer perimeter op and the top perimeter tp) is covered by the radiographic marker 13.

Various faces of the seal 10 may be determined relative to the various perimeters. For example, a top face of the seal 10 may extend from the inner perimeter ip to the outer perimeter op and may comprise the top perimeter tp. A bottom face of the seal 10 may extend from the inner perimeter ip to the outer perimeter op and may comprise the bottom perimeter bp. An inner face of the seal 10, which may comprise inner portions of the top and bottom faces, may extend from the top perimeter tp to the bottom perimeter bp and may comprise the inner perimeter ip. An outer face of the seal 10, which may comprise outer portions of the top and bottom faces, may extend from the top perimeter tp to the bottom perimeter bp and may comprise the outer perimeter op.

FIG. 1C is a side view of the seal 10 and further shows the radiographic marker 13. The radiographic marker 13 is located on an upper part of the outer face of cord 12 and is distributed over the cord 12 in a pattern. In the example of the seal 12, that pattern is an even-width stripe that extends continuously around the outer face and that is located between the outer perimeter op and the top perimeter tp. This position for the marker 13 may in some installations (e.g., such as shown in connection with FIGS. 2A through 2E) reduce interference with surfaces against which the seal 10 may move and/or place the marker 13 in a location closer to a region through which the seal 10 is most likely to extrude. The width w of that stripe may be narrower than a thickness t of the cord 12. As further described below, this may facilitate improved visualization of rolling.

As shown in FIG. 1B, the radiographic marker 13 may be applied to an outer surface of the cord 12. The radiographic marker 13 may, for example, be applied as a slurry or solution that comprises particles of one or more materials having desired radiopacities. Upon drying or curing, the particles or those one or more materials may be bonded to the surface of the cord 12. For convenience, the thickness of the radiographic marker 13 is exaggerated in FIG. 1B. In practice, the thickness of a radiographic marker may be sufficiently thin to avoid interfering with operation of the seal. As described in further detail below, rolling of the seal 10 may occur during use and may be radiographically detected based on the radiographic marker 13. During rolling, a portion of the seal 10 may be rotated, in a poloidal direction P1 or P2, about an axis passing through the center perimeter cp.

Any of various materials may be used to form the radiographic marker 13. Examples include, without limitation, particles and/or nanoparticles of one or more metals (e.g., titanium, tungsten, boron, gold, silver), metal oxides (e.g., titanium dioxide, bismuth oxide, zirconium oxide), and/or other materials (e.g., barium sulfate). The material or materials selected for use as the radiographic marker 13 may have radiopacities greater than a radiopacity of the parent material from which the cord 12 is formed. Those materials may also or alternatively be selected based on an intended end-use of the seal 10. In a version of the seal 10 intended for use in structures formed from materials with lower radiopacities (e.g., certain types of composites and/or plastics), for example, the material(s) selected for the radiographic marker 13 may have less radiopacity than may be the case for a version of the seal 10 intended for use in structures formed from materials with higher radiopacities (e.g., certain metals). Also or alternatively, materials with higher radiopacity (e.g., gold, titanium, silver) may be advantageous for use in very thin markers.

The cord 12 may be formed from any material used for conventional O-rings. Examples of such materials include, without limitation, polymers such as silicone, polytetrafluoroethylene (PTFE), synthetic rubber (e.g., a BUNA butadiene rubber, a BUNA-N nitrile rubber, a neoprene (polychloroprene) rubber, ethylene propylene diene monomer (EPDM), a VITON fluoroelastomer, a butyl rubber, chlorosulfonated polyethylene, epichlorohydrin rubber, ethylene propylene rubber, a perfluoroelastomer, polyisoprene, polysulfide rubber, styrene-butadiene rubber), a thermoplastic elastomer styrenic, a thermoplastic polyolefin (TPO) low-density polyethylene (LDPE) (and/or a TPO high-density polyethylene (HDPE), linear low-density polyethylene (LLDPE), and/or ultra low density polyethylene (ULDPE)), thermoplastic polyurethane (TPU), thermoplastic polyester, a thermoplastic etheresterelastomer, a thermoplastic polyamide, and/or other materials.

Figure 2B:
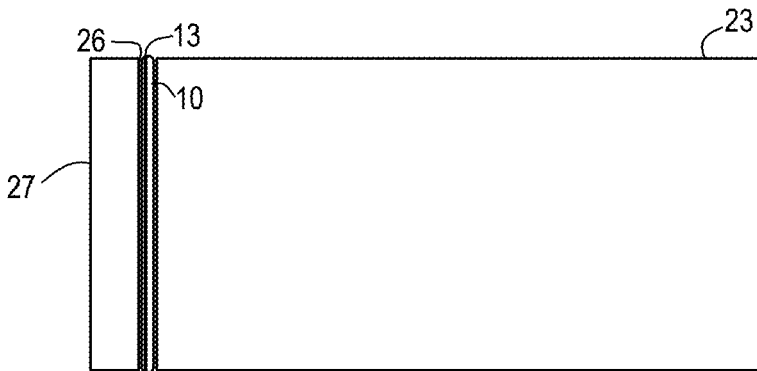
FIG. 2B is a side view of a portion of the structure of FIG. 2A.
Figure 2C:
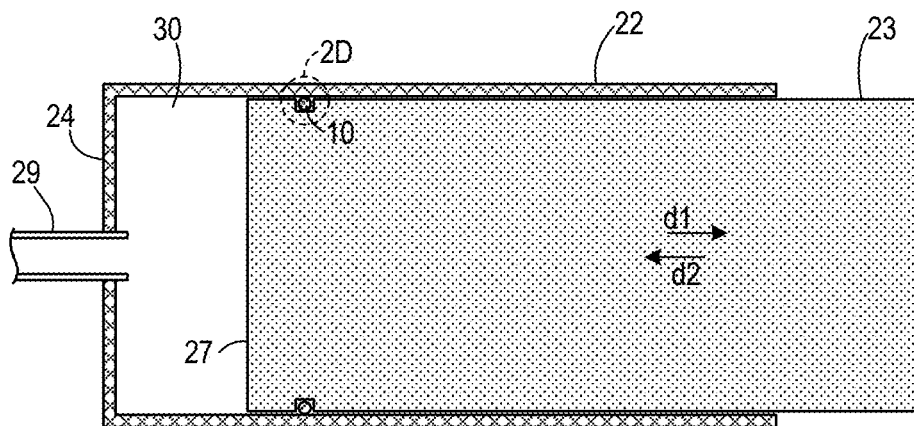
FIG. 2C is a partially schematic area cross-sectional view of the structure of FIG. 2A.

FIG. 2A is a side view of an example structure 20 which may incorporate the seal 10 in a dynamic application. The structure 20 may comprise a sleeve 22 and a cylinder 23. The cylinder 23 may be movable, in direction d1 or d2, within the sleeve 22. In the present example, an end 24 of sleeve 22 may be closed and the cylinder 23 may be solid. A fitting 29 may penetrate the end 24 and may be connected to a valve (not shown) or other component. FIG. 2B is a side view of the cylinder 23 removed from the sleeve 22. A gland 26 may be formed in an outer surface of the cylinder 23 near an end 27 of the cylinder 23. The seal 10 may be installed in the gland 26, with the radiographic marker 13 of the seal 10 facing outward after installation. FIG. 2C is a partially schematic area cross-sectional view of the structure 20 taken from the location indicated in FIG. 2A. The cylinder 23 may move in the directions d1 or d2 to respectively increase or decrease a volume of a space 30.

Figure 2D:
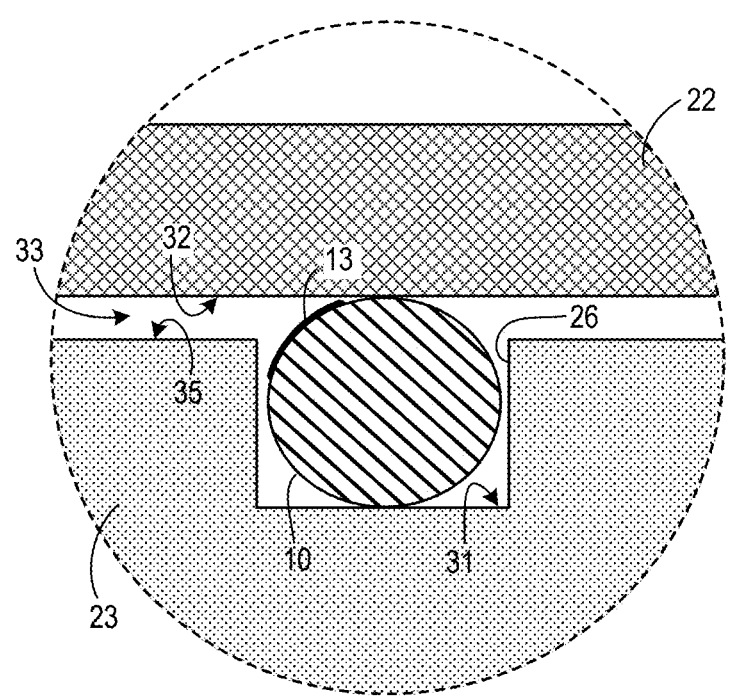
FIG. 2D is an enlarged view of a region of FIG. 2C.

FIG. 2D is an enlarged view of the region indicated in FIG. 2C. In FIG. 2D, no rolling of the seal 10 has occurred. As seen in FIG. 2D, the seal 10 rests in the gland 26 and has been slightly compressed against a floor 31 of the gland 26 by the inner face 32 of the sleeve 22. This compression causes the seal 10 to push against the floor 31 and the face 32 and prevent transfer of fluid through the interface 33 between the face 32 and an outer face 35 of the cylinder 23. In FIG. 2D, and because there has been no rolling of the seal 10, the radiographic marker 13 is facing outward and has an orientation, relative to the remainder of the seal 10, that is generally the same as the orientation of the radiographic marker 13 when the seal 10 is in the laid-flat configuration.

Figure 2E:
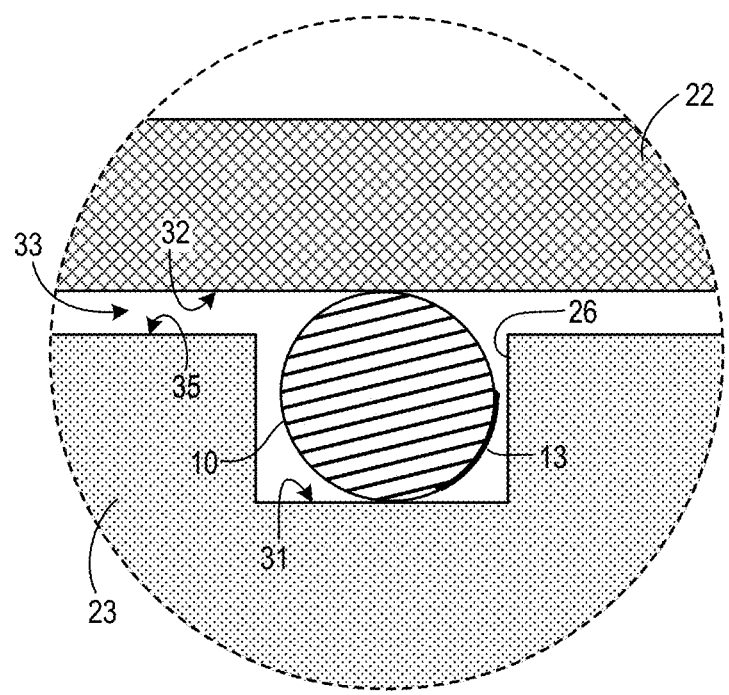
FIG. 2E is an enlarged view similar to that of FIG. 2D.

FIG. 2E is an enlarged view similar to that of FIG. 2D, but showing rolling of the seal 10. The relative motion of the surface 32 and the floor 31, resulting from movement of the cylinder 23 within the sleeve 22, has locally twisted a region of the seal 10 so that the portion of the radiographic marker 13 in that region is no longer in the same orientation. Because rolling is often localized (e.g., some portions of an O-ring may not be rolled or may be rolled to a different extent), the localized twisting of the cord 12 constricts the cord 12 in the rolled regions, and may affect the ability of the rolled regions to press against (and/or create a seal between) the floor 31 and the surface 32. Such localized twisting may also create wrinkles or other deformations in the surface of the seal 10 that further affect sealing.

Figure 3:
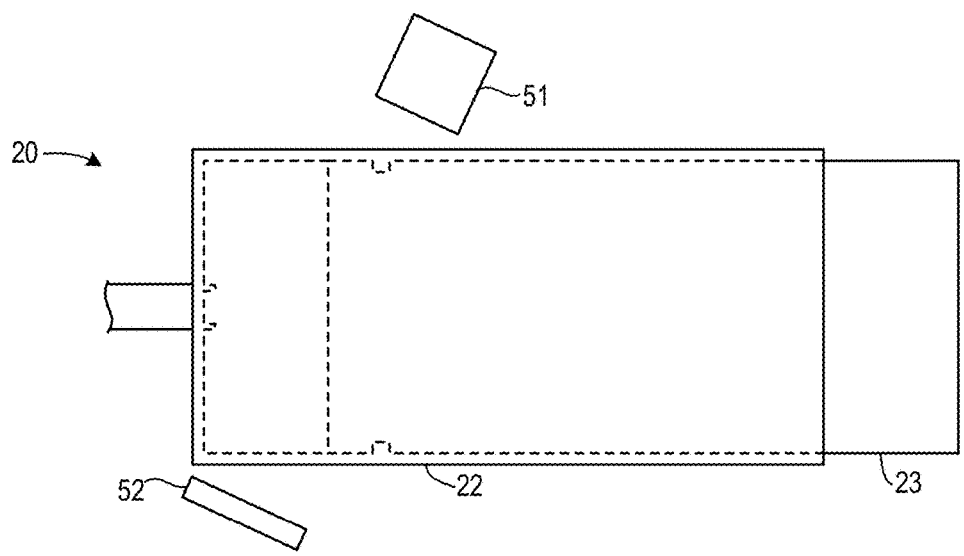
FIG. 3 is a partially schematic diagram showing placement of a radiographic emitter and sensor.

FIG. 3 is a partially schematic diagram showing placement of a radiographic emitter 51 and a radiographic sensor 52 for inspection of the seal 10 within the structure 20. The emitter 51 may comprise a source of X-rays or other radiation (e.g., gamma radiation) able to penetrate the material(s) of the structure. The sensor 52 may comprise an array of pixels configured to detect incident radiation and determine an intensity of such radiation, and to output signal data that may be used (e.g., by image processing software executing on a computing device) to generate a radiographic image. Radiographic emitters and sensors, as well as other equipment used to generate radiographic images and perform radiographic inspection, are well known and thus not further described herein.

Figures 4A, 4B, 4C:
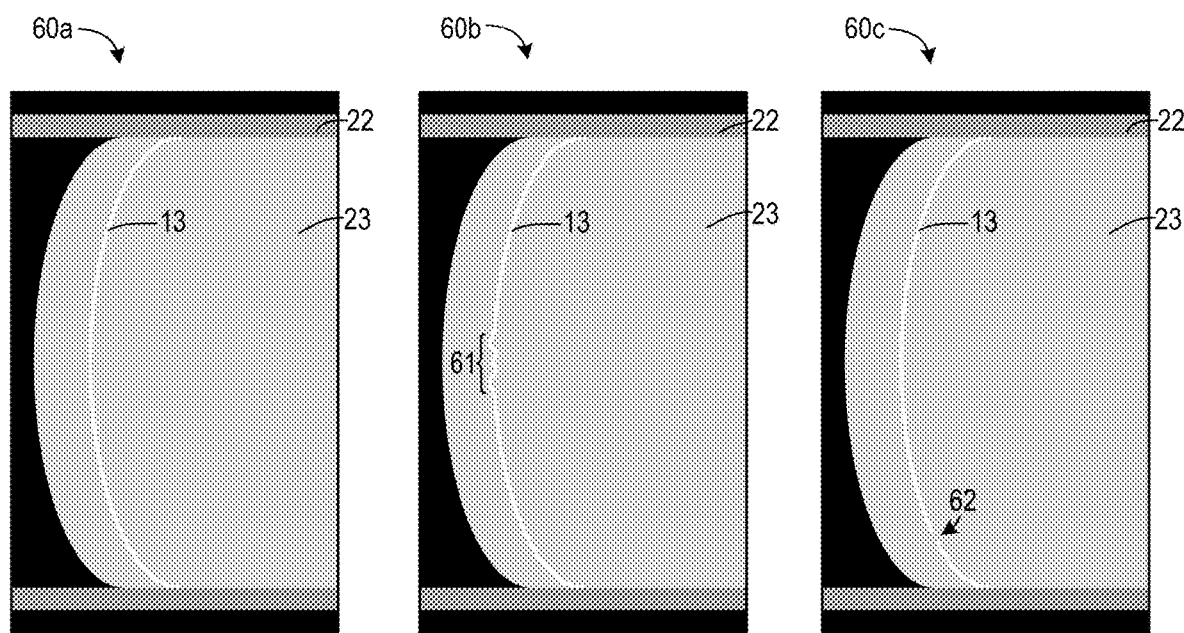
FIGS. 4A, 4B, and 4C are simulated radiographic images of a portion of the structure of FIG. 2A.

FIG. 4A is a simulated radiographic image 60a, associated with the placement of the emitter 51 and the sensor 52 shown in FIG. 3, of a portion of the structure 20. In the simulated image of FIG. 4A, the radiographic marker 13 has an orientation and shape that corresponds the radiographic marker 13 facing outward (as shown in FIG. 2B). Similarly, the position of the radiographic marker 13 relative to other elements (e.g., the cylinder 23) corresponds to the orientation of the seal 10 shown in FIG. 2B. Based on the shape, orientation, and position of the radiographic marker 13 shown in the image 60a, an absence of rolling may be determined.

FIG. 4B is another simulated radiographic image 60b, associated with the placement of the emitter 51 and the sensor 52 shown in FIG. 3, of the same portion of the structure 20. In the image 60b, a region 61 of the radiographic marker 13 has a wavy appearance that may indicate rolling has occurred in that portion of the seal 10. Rolling of a portion of the seal 10 may cause the radiographic marker 13 in the rolled portion to spiral about the center perimeter cp. Because the width w of the radiographic marker 13 is less than the thickness t of the cord 12, this spiraling may appear as a wavy region in a two-dimensional image. Based on the shape, orientation, and position of the radiographic marker 13 shown in the simulated image 60b, a presence of rolling may be determined.

Rolling is merely one type of condition that may be detectable based on one or more radiographic markers associated with an O-ring or other seal. As another example, extrusion and/or other displacement of a seal from a gland (or other intended location) may be visible in a radiographic image as a displacement of a radiographic marker relative to one or more other identifiable elements in the image. Cutting, tearing, and/or other types of damage may also be detectable. For example, tearing or other damage may be visible in a radiographic image as an interruption of a radiographic marker that should be continuous. FIG. 4C is a further simulated radiographic image 60c, associated with the placement of the emitter 51 and the sensor 52 shown in FIG. 3, of the same portion of the structure 20. In the image 60c, a region 62 shows a discontinuity in the marker 13, thereby indicating that the seal 10 may have been severed.

The structure 20 is merely one type of structure into which seals having one or more radiographic markers may be incorporated. Such seals may be used in a wide variety of dynamic applications. Examples include, without limitation, applications in which a seal is used in an interface associated with a rotating element, applications in which a seal is used in an interface associated with an element having combined rotation and translation, applications in which a seal may undergo repeated compression and release (e.g., a seal around an edge of a hatch), and/or applications in which a seal may be exposed to other dynamic conditions. Seals having one or more radiographic markers may also or alternatively be used in static applications. Elements of a structure that hold, contact, or otherwise interact with a seal having one or more radiographic markers need not be cylindrical or circular, and may have other shapes.

An O-ring or other seal may comprise multiple radiographic markers and/or radiographic markers in various patterns. FIG. 5A is a top view of an example seal 110 comprising multiple radiographic markers. The seal 110 may be an O-ring comprising a cord 112 similar to the cord 12 of the seal 10. The seal 110 may have, in a laid-flat configuration, an outer diameter od1, an inner diameter id1, and a center c1 that are respectively similar to the outer diameter od, the inner diameter id, and the center c of the seal 10. As shown in FIG. 5B, an enlarged, partially schematic area cross-sectional view of the seal 110 taken from the location indicated in FIG. 5A, the cord 112 may have a circular cross-section and the seal 110 may thus have a toroidal shape in the laid-flat configuration. A inner perimeter ip1, an outer perimeter op1, a top perimeter tp1, a bottom perimeter bp1, and a center perimeter cp1 may respectively be similar to the inner perimeter ip, the outer perimeter op, the top perimeter tp, the bottom perimeter bp, and the center perimeter cp of the cord 12 of the seal 10. A top face, a bottom face, an inner face, and an outer face of the seal 110 may be determined, relative to the inner perimeter ip1, the outer perimeter op1, the top perimeter tp1, and the bottom perimeter bp1, similar to the top, bottom, inner, and outer faces of the seal 10.

FIG. 5C is a side view of the seal 10. Unlike the seal 10, which has a single radiographic marker 13, the seal 110 comprises two radiographic markers 113a and 113b. The radiographic markers 113a and 113b are located on the outer face of cord 112 and are distributed over the cord 112 in a pattern. In the example of the seal 112, that pattern is pair of even-width (w1) stripes that extend continuously around the outer face and that are centered above and below the outer perimeter op2. The radiographic markers 113a and 113b may be applied to the outer face of the cord 112 similar to how the radiographic marker 13 may be applied to the outer face of the cord 12. Any of the materials described in connection with the cord 12 may be used for the cord 112. Any of the materials described in connection with the radiographic marker 13 may be used for the radiographic markers 113a and 113b.

As shown in FIG. 5B, the radiographic marker 113a may be located, between the outer perimeter op1 and the top perimeter tp1, in a top part of the outer face of the seal 110. The radiographic marker 113b may be located, between the outer perimeter op1 and the bottom perimeter bp1, in a bottom part of the outer face of the seal 110. A portion of the outer face surrounding the outer perimeter op1 may lack a radiographic marker. Because this portion of a seal may, in some uses, be subject to the greatest force by a component surface, omitting a radiographic marker from this portion may reduce risk of a radiographic marker interfering with seal operation and/or of being worn away by movement against a component surface. Similar to the radiographic marker 13 in FIG. 1B, the thickness of the radiographic markers 113a and 113b in FIG. 5B is exaggerated for convenience.

Figure 6A:
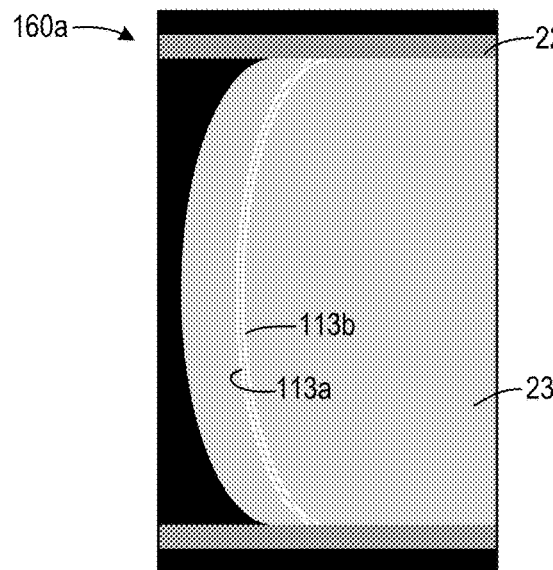
FIGS. 6A and 6B are additional simulated radiographic images.

Radiographic markers in a pattern such as that of the radiographic markers 113a and 113b may further facilitate use of radiography to detect rolling. FIG. 6A is a simulated radiographic image 160a of the structure 20 having the seal 110 instead of the seal 10 located in the gland 26. In the simulated image 160a, which may correspond to a placement of the emitter 51 and the sensor 52 similar that shown in FIG. 3, orientations, positions, and shapes of the radiographic markers 113a and 113b are similar to what is shown in FIG. 5C. Based on the orientations, positions, and shapes of the radiographic markers 113a and 113b shown in the simulated image 160a, an absence of rolling may be determined.

Figure 6B:
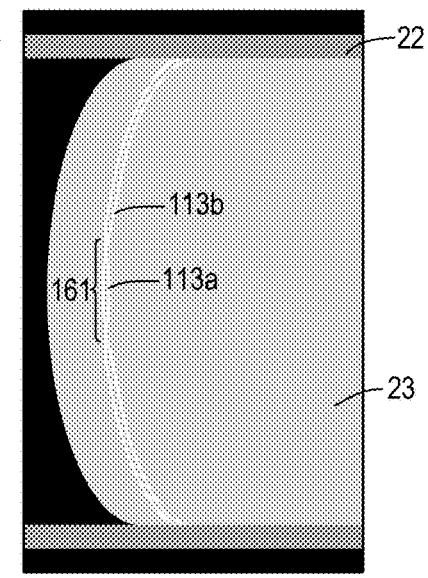

FIG. 6B is another simulated radiographic image 160b, associated with a placement of the emitter 51 and the sensor 52 as shown in FIG. 3, of the same portion of the structure 20 that is shown in the simulated image 160a. In a region 161 of the image 160b, the radiographic markers 113a and 113b cross each other. This crossing corresponds, in the two dimensions of the simulated image 160b, to an outer face portion of the seal 110 twisting to face the floor 31 of the gland 26. Based on the orientations, positions, and shapes of the radiographic markers 113a and 113b shown in the simulated image 160b, a presence of rolling may be determined.

Also or alternatively, radiographic markers of a seal may formed so as to have different appearances. In the example of the seal 110, for example, one of the radiographic markers 113a and 113b could be a dashed line, and the other could be a solid line. A radiographic image showing the relative locations of the solid and dashed lines to change in one or more regions may indicate rolling. Instead of, or in addition to, different line types, different radiographic marker materials could be used for different radiographic markers of a seal. Those different radiographic marker materials may cause one of those radiographic markers to appear noticeably brighter in an image than another radiographic marker.

Figure 7A:
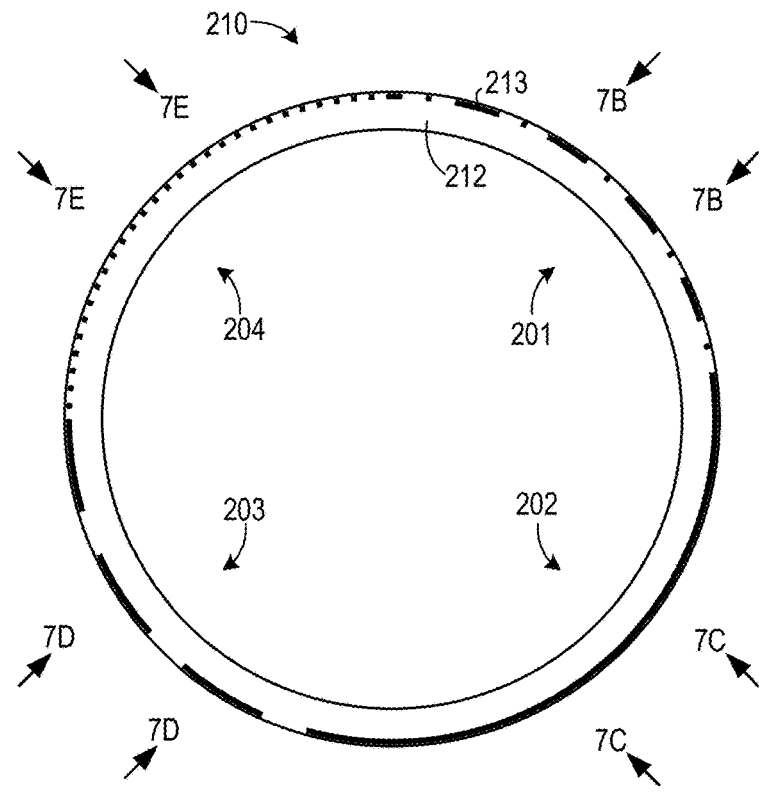
FIG. 7A is a top view of another example seal comprising a radiographic marker.
Figure 7B:
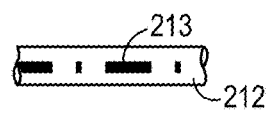
FIGS. 7B, 7C, 7D, and 7E are side views of portions of the seal of FIG. 7A.
Figure 7C:
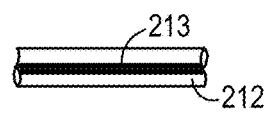
Figure 7D:
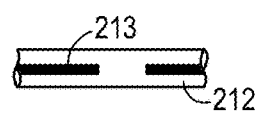
Figure 7E:
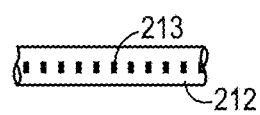

Also or alternatively, different portions of a radiographic marker could be formed to have different appearances. FIG. 7A is a top view of an example seal 210 that may comprise such a radiographic marker. The example seal 210 may be an O-ring similar to the seal 10 and may comprise a cord 212, similar to the cord 12, that may be formed from any of the materials that may be used to form the cord 12. The seal 210 further comprises a radiographic marker 213 that may be formed from any of the materials that may be used to form the radiographic marker 13. The radiographic marker 213 may be extend around an outer face of the seal 210. Unlike the radiographic markers 13, 113a, and 113b, however, the radiographic marker 213 may have a different appearance in different portions of the seal 210. In a first section 201, and as shown in FIG. 7B (a side view, from the location indicated in FIG. 7A, of the outer surface of a portion of the seal 210 comprising the section 201), the radiographic marker 213 may have a first appearance (e.g., a series of repeating short and long dashes). In a second section 202, and as shown in FIG. 7C (a side view, from the location indicated in FIG. 7A, of the outer surface of a portion of the seal 210 comprising the section 202, the radiographic marker 213 may have a second appearance (e.g., a solid line). In a third section 203, and as shown in FIG. 7D (a side view, from the location indicated in FIG. 7A, of the outer surface of a portion of the seal 210 comprising the section 203), the radiographic marker 213 may have a third appearance (e.g., a series of repeating long dashes). In a fourth section 204, and as shown in FIG. 7E (a side view, from the location indicated in FIG. 7A, of the outer surface of a portion of the seal 210 comprising the section 204), the radiographic marker 213 may have a fourth appearance (e.g., a series of repeating short dashes).

A radiographic marker such as the radiographic marker 213 may, for example, be used to determine if a position of a seal has shifted. For example, the seal 210 may be installed in the gland 26 of the cylinder 23 so that the section 202 should be in the center of an image such as the simulated image 60a. If a radiographic image shows the section 204 in the center of the image, it may be determined that the seal 210 has somehow shifted from its original position. Although sections 201, 202, 203, and 204 correspond to quadrants of the seal 210 in a laid-flat configuration, differing radiographic marker appearances could be provided in more or fewer sections. For example, arcuate sections smaller or larger than quadrants could be selected to have different radiographic marker appearances. Sections having different radiographic marker appearances need not be the same size. A radiographic marker such as the radiographic marker 213 may also or alternatively be located on different portion(s) of an O-ring (e.g., in locations such as locations of the markers 13, 113a, and/or 113b).

A radiographic marker may have other shapes or size. For example, radiographic marker may comprise one or more symbols (e.g., a plus sign ("+"), an "x," a polygon, etc.), one or more characters (e.g., letters and/or numbers), one or more other patterns, etc.

Figures 8A, 8B:
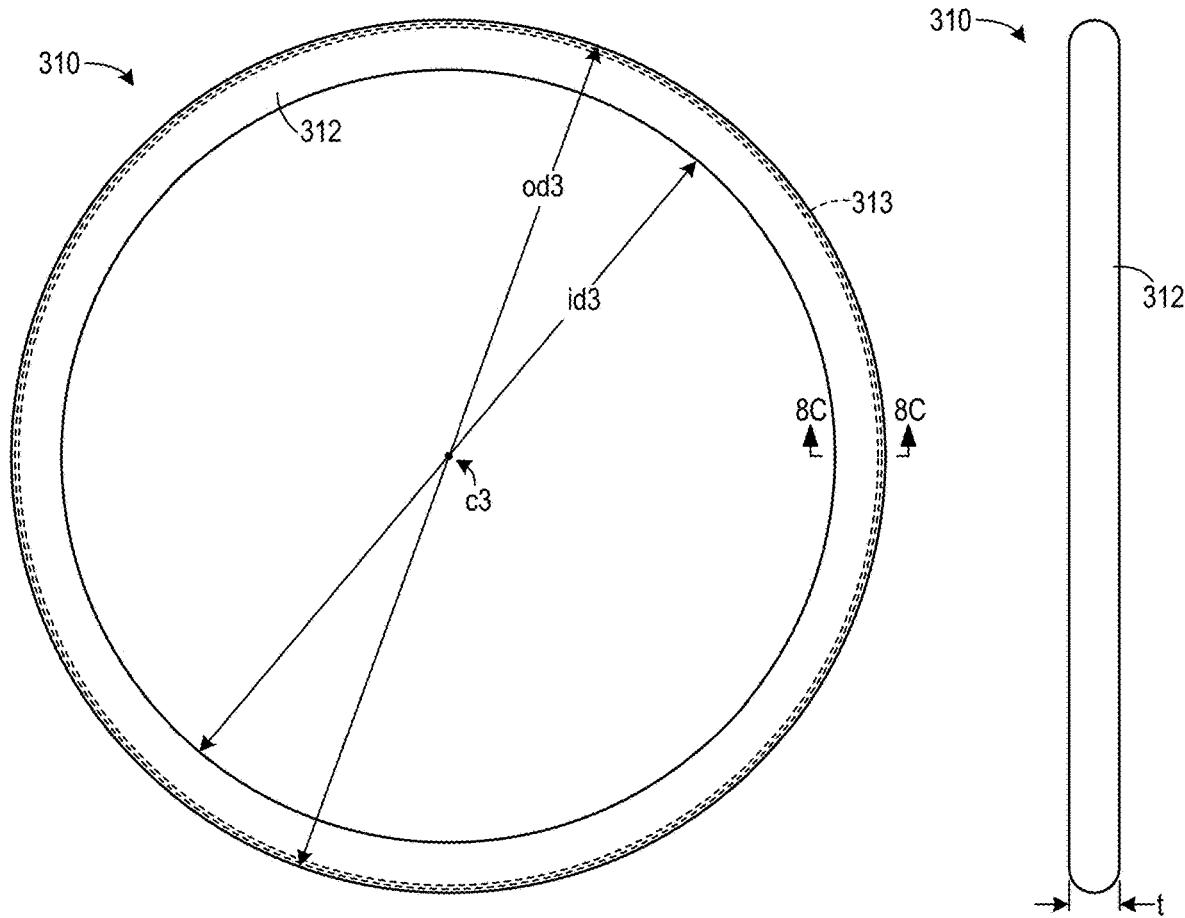
FIG. 8A is a top view of another example seal comprising radiographic markers.
FIG. 8B is a side view of the seal of FIG. 8A.

Also or alternatively, an O-ring or other type of seal may comprise one or more radiographic markers that have been embedded in the material of a cord or other body of the seal. FIG. 8A is a top view of an example seal 310 that may comprise such a radiographic marker. The example seal 310 may be an O-ring similar to the seal 10 and may comprise a cord 312, similar to the cord 12, that may be formed from any of the materials that may be used to form the cord 12. The seal 310 may have, in a laid-flat configuration, a center c3, an inside diameter id3, and an outside diameter od3 that are respectively similar to the center c, the inside diameter id, and the outside diameter od of the seal 10.

Unlike the radiographic markers 13, 113a, 113b, and 213, the radiographic marker 313 may be embedded in the material of the cord 312. As indicated by the broken lines in FIG. 8A, the radiographic marker 313 may extend around a perimeter of the seal 310. FIG. 8B is a side view of the seal 310 and shows that the embedded radiographic marker 313 may not be visible on an outer surface of the seal 310.

Figures 8C, 9:
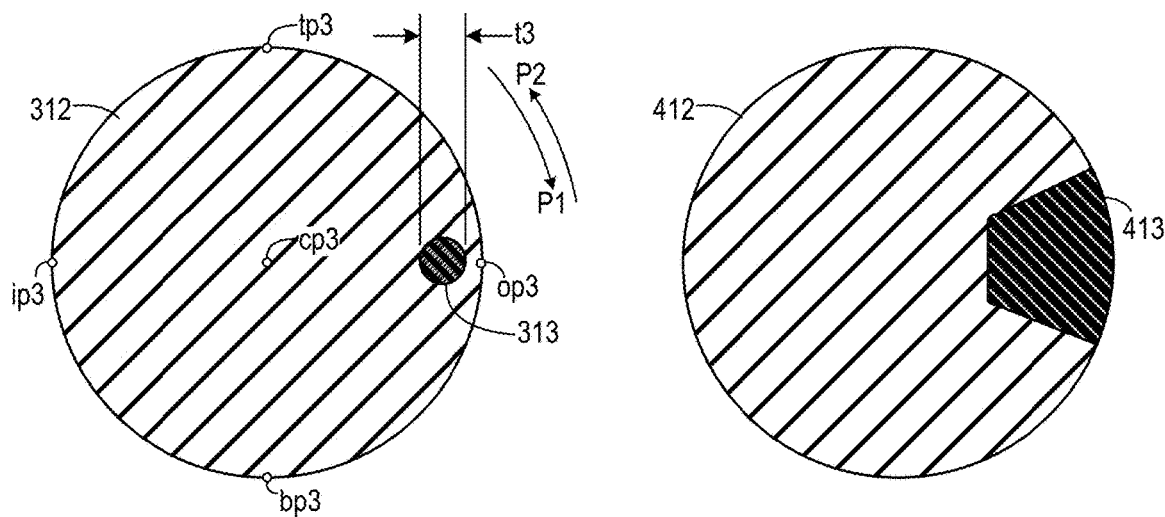
FIG. 8C is an enlarged, partially schematic area cross-sectional view of the seal of FIG. 8A.
FIGS. 9, 10, 11, 12, and 13 are partially schematic area cross-sectional views of additional example seals.

FIG. 8C is an enlarged, partially schematic area cross-sectional view of the seal 310 taken from the location indicated in FIG. 8A. The cord 312 may have a circular cross-section and the seal 310 may thus have a toroidal shape in the laid-flat configuration. An inner perimeter ip3, an outer perimeter op3, a top perimeter tp3, a bottom perimeter bp3, and a center perimeter cp3 may respectively be similar to the inner perimeter ip, the outer perimeter op, the top perimeter tp, the bottom perimeter bp, and the center perimeter cp of the cord 12 of the seal 10. A top face, a bottom face, an inner face, and an outer face of the seal 310 may be determined, relative to the inner perimeter ip3, the outer perimeter op3, the top perimeter tp3, and the bottom perimeter bp3, similar to the top, bottom, inner, and outer faces of the seal 10.

The radiographic marker 313 may comprise a region of the cord 312 that is formed from a material different from material(s) used for a remainder of the cord 312. The material forming the radiographic marker 313 may have a radiopacity greater than that of the material(s) forming other portions of the cord 312. The material of the radiographic marker 313 may, for example, comprise a base material into which one or more radiographic marker materials (e.g., one or more of the materials that may be used for the radiographic marker 13) have been mixed. The base material of the radiographic marker 313 may comprise the same material(s) used for other portions of the cord 312, and/or may comprise other materials. The cord 312 may be formed, for example, by molding material for the remainder of the cord 312 around the material for the radiographic marker 313 (e.g., a base material with radiographic marker material(s) mixed in). Because a thickness t3 of the radiographic marker 313 is less than a thickness t of the cord 312, and because the radiographic marker 313 is displaced from the center perimeter cp3, rolling may be detected based on how the radiographic marker 313 may appear in a radiographic image.

An embedded radiographic marker need not be completely embedded. For example, FIG. 9 shows a partially schematic area cross-sectional view of a cord 412 of a seal similar to the seal 310. The cord 412 may be formed from any of the materials that may be used to form the cord 12. A radiographic marker 413, which may be formed from a base material and one or more radiographic marker materials similar to the radiographic marker 313, is embedded in a portion of the cord 412 and forms a portion of an outer face of the seal. The configuration of FIG. 9 may, for example, simplify fabrication of the cord 412 using coextrusion.

Radiographic markers may also be used with ring-type seals having other types of cross-sections. Several non-limiting examples of such seals are shown in FIGS. 10-13. Each of FIGS. 1-13 is a partially schematic area cross-sectional view of a cord of a ring-type seal and is taken from a location similar to that indicated in FIG. 1A for the area cross-sectional view of claim FIG. 1B. In each of FIGS. 10-12, an inner face, top face, outer face, and bottom face is indicated. The faces indicated in FIGS. 10-12 may have relationships, relative to a seal in a laid-flat configuration, similar to those described for the inner, top, outer, and bottom faces of the seal 10.

Figure 10:
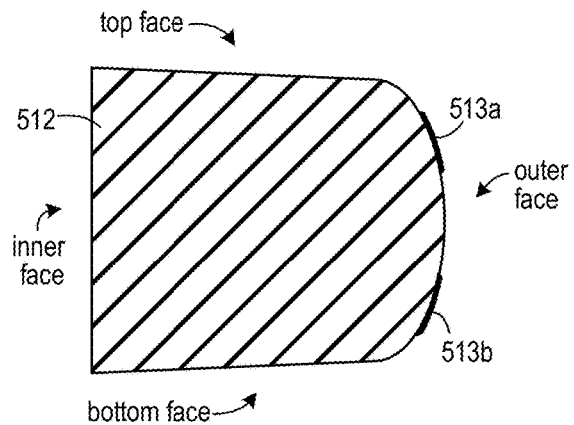
Figure 11:
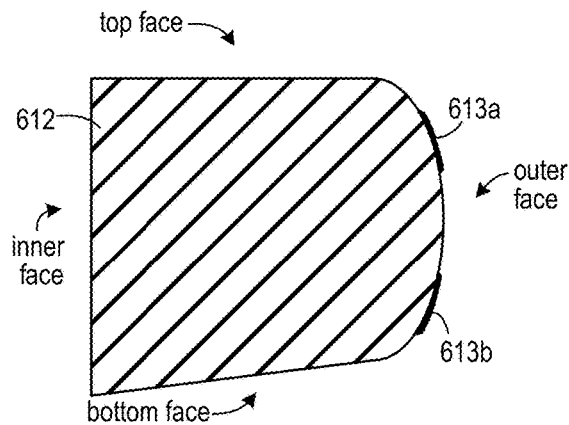
Figure 12:
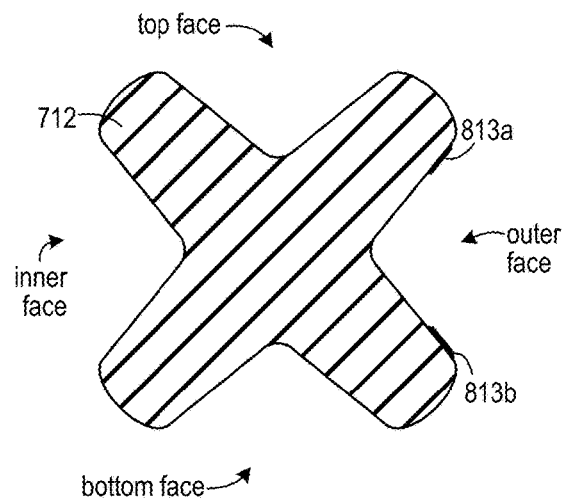
Figure 13:
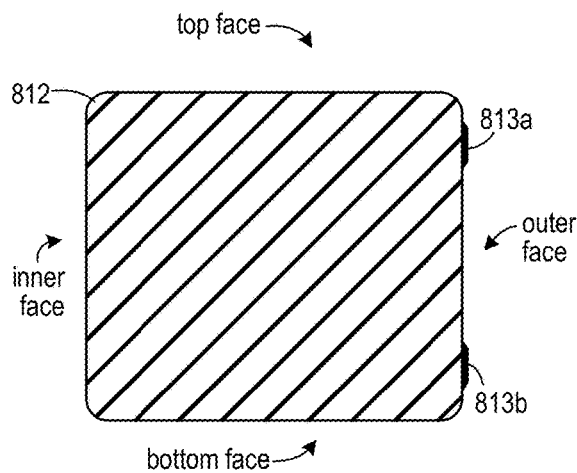

A cord 512 of the seal of FIG. 10 has a "D" cross-section. Radiographic markers 513a and 513b are shown on an outer face of the seal of FIG. 10. A cord 612 of the seal of FIG. 11 also has a "D" cross-section. Radiographic markers 613a and 613b are shown on an outer face of the seal of FIG. 11. The seal of FIG. 11 differs slightly from that of FIG. 10. Specifically, the bottom face of the seal of FIG. 11 is slightly larger than the top face of that seal. Because of this asymmetry, the seal may be designed for a specific orientation when installed. The radiographic markers 613a and 613b may have different appearances (e.g., one may comprise a solid line and the other may comprise dashed lines) to facilitate determining, by radiographic inspection, if the seal has been improperly installed. A cord 712 of the seal of FIG. 12 has an "X" cross-section. Radiographic markers 713a and 713b are shown on an outer face of the seal of FIG. 12. A cord 812 of the seal of FIG. 13 also has a rectangular cross-section. Radiographic markers 813a and 813b are shown on an outer face of the seal of FIG. 13. As with previous figures, the thicknesses of radiographic markers in FIGS. 10-13 is exaggerated for convenience. The cords 512, 612, 712, and/or 812 may be formed from any of the materials described in connection with the cord 12. The radiographic markers 513a, 513b, 613a, 613b, 713a, 713b, 813a, and 813b may extend around an entire seal or only a portion of the seal, may have any appearance, and may be formed from any of the materials described in connection with the radiographic marker 13. Any of the seals of FIGS. 10-13 may have a single radiographic marker. Also or alternatively, any of the seals of FIGS. 10-13 may comprise one or more embedded radiographic markers.

Although example seals described above comprise radiographic markers located on or near outer faces, this is not required. A seal could also or alternatively comprise one or more radiographic markers on or near a top face, one or more markers on or near an inner face, and/or one or more radiographic markers on or near a bottom face. A seal may comprise more than two radiographic markers. A radiographic marker need not extend around an entire perimeter of a ring-type seal. Moreover, a radiographic marker of a ring-type seal need not have a perimeter orientation. For example, a ring-type seal may comprise one or more radiographic markers that extend in a poloidal direction around a cord, in a helical direction, and/or in other directions. Seals other than ring-type seals may include radiographic markers, and such radiographic markers may be used to determine a seal condition via radiographic inspection.

As indicated above, radiographic markers may also or alternatively be added to flexible and/or deformable mechanical elements other than O-rings and/or other ring-type seals. A marker material (e.g., one of the marker materials previously indicated) may be applied to a surface of the mechanical element and/or embedded in a parent material forming a body of the mechanical element. Radiographic images of an assembled device, system, and/or other structure incorporating the mechanical element may then be used to determine a condition of the radiographically-marked mechanical element as-installed in that assembled structure, device, and/or system. That condition, as indicated by one or more radiographic images, may comprise the presence of a tear, rip, puncture, cut, wear, and/or other damage to the radiographically-marked mechanical element. Also or alternatively, a condition indicated by one or more radiographic images may comprise a displacement of the radiographically-marked mechanical element from an intended position. Also or alternatively, a condition indicated by one or more radiographic images may comprise an incorrect installation of the radiographically-marked mechanical element. Also or alternatively, a condition indicated by one or more radiographic images may comprise a deformation of the radiographically-marked mechanical element.

Figure 14:
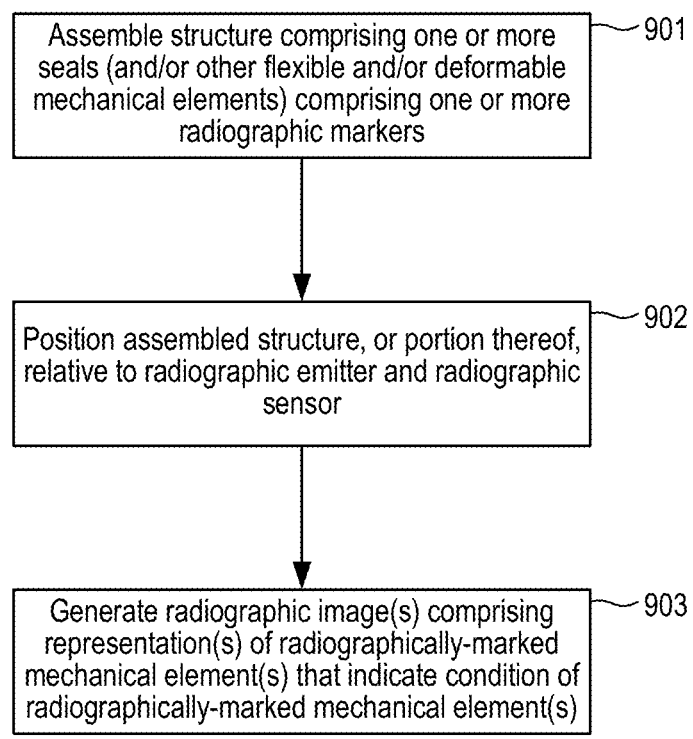
FIG. 14 is a flow chart showing an example method for radiographic inspection of a structure incorporating a seal (and/or other flexible and/or deformable mechanical element) having one or more radiographic markers.

FIG. 14 is a flow chart showing steps of an example method for radiographic inspection of a structure incorporating one or more seals (or other flexible and/or deformable mechanical element) that comprise one or more radiographic markers. One or more steps of the method may be omitted, performed in an order other than shown in FIG. 14, and/or otherwise modified. One or more other steps may be added.

In step 901, a structure comprising one or more installed radiographically-marked mechanical elements may be assembled. For example, a seal may be placed in a gland of an element (e.g., the cylinder 23), and that element may be assembled with one or more other elements (e.g., the sleeve 22). The seal may, for example, comprise one of the seals described above.

In step 902, the assembled structure, or a portion thereof, may be positioned relative to a radiographic emitter (e.g., the emitter 51) and a radiographic sensor (e.g., the sensor 52). The positioning of step 902 may comprising placing the emitter and/or sensor relative to the structure (or portion thereof) and/or placing the structure (or portion thereof) relative to the emitter and/or sensor.

In step 903, one or more radiographic images may be generated based on detection, by the sensor, of radiographic energy emitted by the emitter. The one or more generated images (e.g., images such as the simulated images 60a, 60b, 60c, 160a, and/or 160b) may comprise one or more representations of the radiographic marker that indicate a condition of the radiographic marker and/or of the radiographically-marked mechanical element. Radiographic images may be generated using one or more of various radiographic imaging processes. Such processes may comprise generation of still images, cineradiography, computerized tomography (CT) scanning, etc. For example, artificial intelligence may be used (e.g., in combination with known dimensions of components in an imaged assembly) to deconvolve images that may be superimposed on one another (e.g., to remove portions of an image not needed for diagnosis of a condition of one or more assembly components).

As indicated above, the method of FIG. 14 may be performed with regard to flexible and/or deformable mechanical elements, in addition to or other than seals, that comprise one or more radiographic markers (and/or with regard to structures incorporating such elements). Additional examples of such to flexible and/or deformable mechanical elements that comprise one or more radiographic markers are shown in FIGS. 15A through 17B.

Figures 15A, 15B:
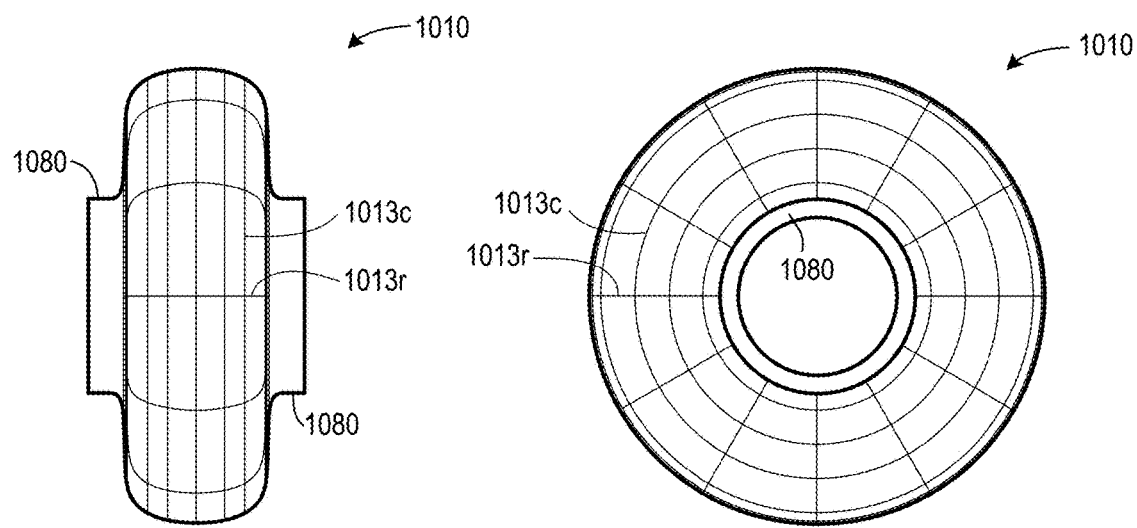
FIGS. 15A and 15B are respective side and rear views of an example main body of a tire-type flexible coupling comprising radiographic markers.

FIG. 15A is a side view of a main body 101 of a tire-type flexible coupling. A coupler having the main body 1010 may comprise flanges (not shown), attached to rims 1080 and/or bonded to front and rear faces of the main body 1010, that may be used to connect the coupler to other components. The main body 1010 may be formed from an elastomer such as artificial rubber (and/or from other polymeric material(s)) and may comprise embedded cord reinforcements. FIG. 15B is a rear view of the main body 1010. A front view of the main body 1010 may be the same as the rear view. An outer surface of the main body 1010 may comprise a plurality of radiographic markers. Such radiographic markers may comprise, for example, one or more radial line markers 1013r and/or one or more circumferential line markers 1013c. The markers 1013r and/or 1013c, and/or other markers, may be formed from one or more materials (e.g., materials, such as those described above for other radiographic markers, applied in ways similar to those described above for other radiographic markers) having radiopacities greater than a radiopacity of the parent material of the main body 1010. Also or alternatively, the main body 1010 may comprise radiographic markers in other patterns(s) and/or locations of the exterior surface, may comprise radiographic markers on an interior surface, and/or may comprise radiographic markers embedded in the parent material of the main body 1010. The markers 1013c and/or 1013r may be used to determine damage to, improper installation of, and/or distortion of the coupler comprising the main body 1010. Examples of such detectable distortion may, for example, comprise excessive elongation or compression in the axial direction (e.g., if separation between the rims 1080 is too small or too large).

Figures 16A, 16B:
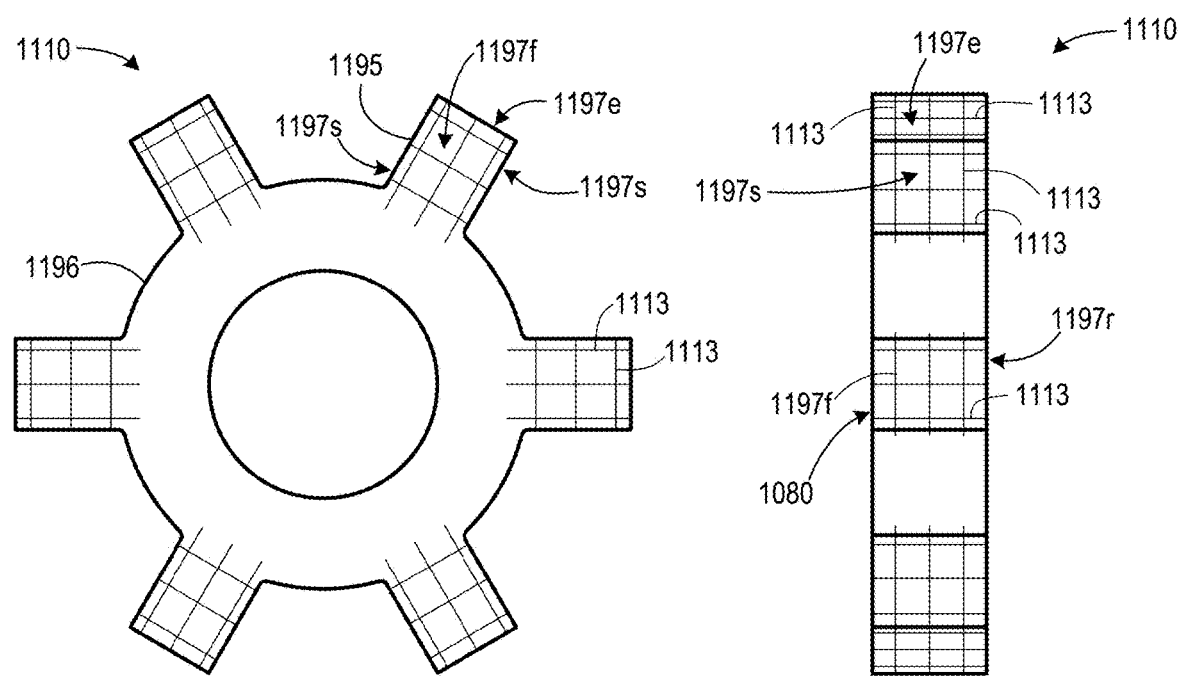
FIGS. 16A and 16B are respective front and side views of an example elastomeric insert, from a jaw-type flexible coupling, comprising radiographic markers.

FIG. 16A is a front view of an example elastomeric insert 1110 (also known as a "spider"), from a jaw-type flexible coupling, comprising radiographic markers. FIG. 16B is a side view of the insert 1110. A rear view may be the same as the front view of FIG. 16A. The insert 1110 comprises a plurality of spokes 1195 extending from a hub 1196. Each of the spokes 1195 comprises an end face 1197e, side faces 1197s, a front face 1197f, and a rear face 1197r. Radiographic markers 1113 (e.g., lines) may be applied to surfaces of those faces. A main body of the insert 1110 may be formed from artificial rubber and/or other elastomeric or polymeric material. The markers 1113, and/or other markers, may be formed from one or more materials (e.g., materials, such as those described above for other radiographic markers, applied in ways similar to those described above for other radiographic markers) having radiopacities greater than a radiopacity of the parent material of the main body of the insert 1110. Also or alternatively, the main body may comprise radiographic markers in other patterns(s) and/or locations, and/or may comprise radiographic markers embedded in the parent material of the main body. The markers 1113 may be used to determine damage to, improper installation of, and/or distortion of the coupler comprising the insert 1113. Examples of such detectable distortion may, for example, distortion of an end face 1197e indicative of misalignment.

Figure 17A:
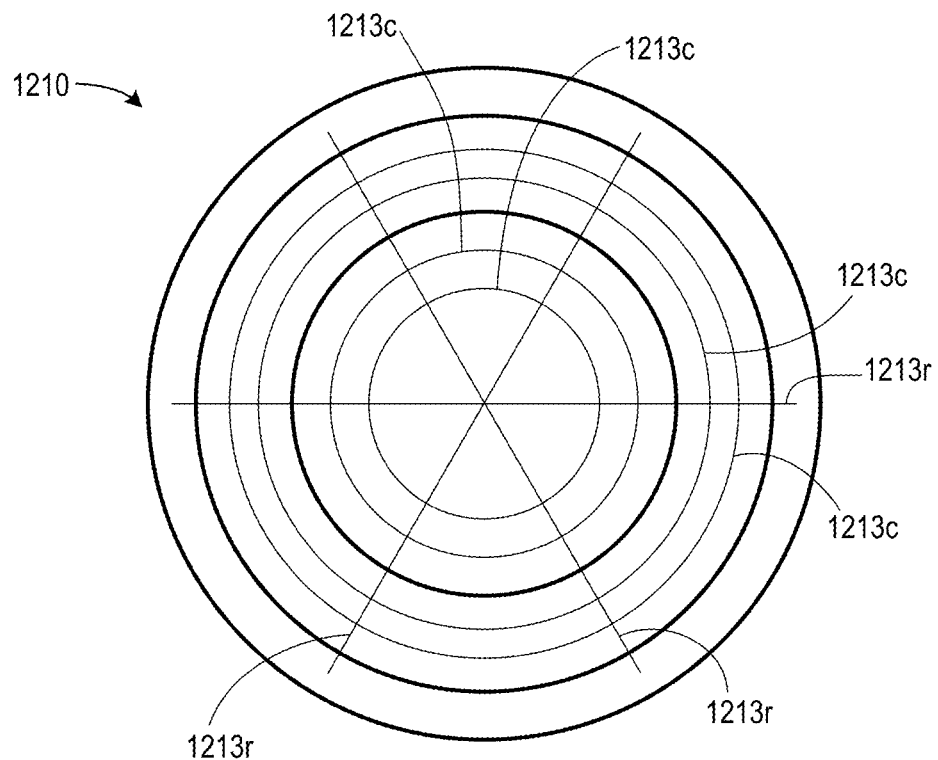
FIGS. 17A and 17B are respective top and side views of an example diaphragm comprising radiographic markers.
Figure 17B:
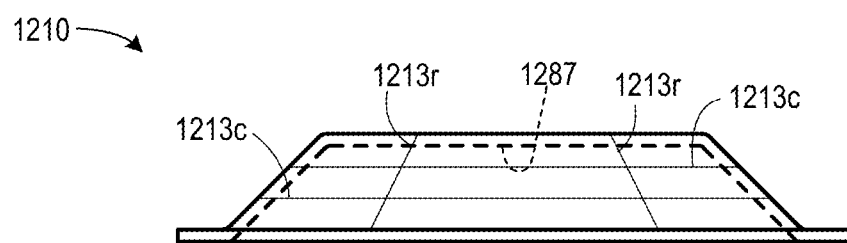

FIG. 17A is a top view of an example diaphragm 1210 comprising radiographic markers. FIG. 17B is a side view of the diaphragm 1210 and shows, in hidden lines, location of an interior surface 1287 of the diaphragm 1210. A main body of the diaphragm 1210 may be formed from an elastomer such as artificial rubber and/or from other polymeric material(s). A top surface of the main body may comprise a plurality of radiographic markers. Such radiographic markers may comprise, for example one or more radial line markers 1213r and/or one or more circumferential line markers 1213c. The markers 1213r and/or 1213c, and/or other markers, may be formed from one or more materials (e.g., materials, such as those described above for other radiographic markers, applied in ways similar to those described above for other radiographic markers) having radiopacities greater than a radiopacity of the parent material of the main body. Also or alternatively, the main body may comprise radiographic markers in other patterns(s) and/or locations of the exterior surface, may comprise radiographic markers on the interior surface 1287, and/or may comprise radiographic markers embedded in the parent material of the main body. The markers 1213c and/or 1213r may be used to determine damage to, improper installation of, and/or distortion of the diaphragm 1210. Examples of such detectable distortion may, for example, comprise interruption and/or displacement of the markers 1213c and/or 1213r indicative of known failure modes and/or operational anomalies of diaphragms (e.g., cracking, implosion, tearing, oval-shaped diaphragm distortion, diaphragm bloating, diaphragm star pattern, etc.).

Use of flexible and/or deformable mechanical elements comprising radiographic markers may facilitate inspection of a mechanical system without disassembly and/or while that system is operating. Disassembly of a mechanical system may be time-consuming and/or otherwise impractical and/or inconvenient, and may preclude inspection of components while the assembled system is operating. Moreover, disassembly may disturb a configuration of components that may be part of a problem (e.g., misaligned or improperly installed components) that an inspection is trying to diagnose.

One or more physical elements (and/or portion(s) thereof) and/or methods (and/or portions thereof) described herein may be used in combination with one or more physical elements (and/or portion(s) thereof) and/or methods (and/or portions thereof) described in the U.S. patent application titled "Mechanical Components With Radiographic Markers," and filed on even date herewith. Said application, in its entirety, is incorporated by reference herein.

For the avoidance of doubt, the present application includes, but is not limited to, the subject-matter described in the following numbered clauses:

1. A flexible and/or deformable mechanical element comprising one or more radiographic markers.

2. The element of clause 1, wherein the one or more radiographic markers comprise one or more marker materials having a radiopacity greater that a radiopacity of a parent material of the element.
3. The element of clause 1 or clause 2, wherein the parent material comprises and elastomeric and/or polymeric material.
4. The element of any of clauses 1-3, wherein the one or more marker materials comprise at least one of: a metal, a metal oxide, or another metallic compound.
5. The element of any of clauses 1-4, wherein the element comprises one or more of: a seal, a drive belt, a diaphragm, a bladder, a coupler, a bellows, a spring, or a bust disc.
6. The element of any of clauses 1-4, wherein the element comprises an O-ring.
7. The element of clause 6, wherein the O-ring comprises a cord comprising a polymeric first material as a parent material, wherein the cord has a circular cross section and is formed into a continuous loop.
8. The element of any of clauses 6-7, wherein the one or more radiographic markers comprise one or more second materials, as one or more marker materials having one or more radiopacities greater than a radiopacity of the first material, on a surface of the cord.
9. The element of any of clauses 6-8, wherein the one or more radiographic markers are in a pattern configured to indicate, based on displacement of one or more portions of the pattern in a radiographic image, a condition of the O-ring.
10. The element of any of clauses 6-9, wherein the one or more radiographic markers comprise a radiographic marker extending around a perimeter of the cord.
11. The element of any of clauses 6-10, wherein the one or more radiographic markers comprise a stripe, extending around a perimeter of the cord, having a width less than a thickness of the cord.
12. The element of any of clauses 6-11, wherein an outer face of the cord comprises an outer perimeter that forms an outermost boundary of the cord, an upper face of the cord comprises an upper perimeter that forms an uppermost boundary of the cord, and a lower face of the cord comprises a lower perimeter that forms a lowermost boundary of the cord, and wherein the one or more radiographic markers are distributed on the outer face and are displaced from the upper perimeter, the outer perimeter, and the lower perimeter.
13. The element of any of clauses 6-12, wherein the cord comprises a plurality of arcuate sections, and wherein each of the arcuate sections comprises a portion of the one or more radiographic markers that is distinguishable from portions of the one or more radiographic markers located in the other arcuate sections.
14. The element of any of clauses 6-13, wherein the first material comprises silicone, polytetrafluoroethylene (PTFE), a synthetic rubber, a thermoplastic elastomer styrenic, a thermoplastic polyolefin (TPO) low-density polyethylene (LDPE), a TPO high-density polyethylene (HDPE), a TPO linear low-density polyethylene (LLDPE), a TPO ultra low density polyethylene (ULDPE), thermoplastic polyurethane (TPU), thermoplastic polyester, a thermoplastic etheresterelastomer, or a thermoplastic polyamide.
15. The element of any of clauses 6-14, wherein the one or more second materials comprise one of more of particles of one or more metals, nanoparticles of one or more metals, titanium dioxide, bismuth oxide, zirconium oxide, or barium sulfate.
16. The element of any of clauses 6-15, wherein the one or more radiographic markers comprise a plurality of stripes extending along the entire cord.
17. The element of any of clauses 1-4, wherein the element comprises a seal.
18. The element of clause 17, wherein the seal consists essentially of: a cord of a polymeric first material as a parent material, wherein the cord is formed into a continuous loop; and the one or more radiographic markers, formed from one or more second materials, as the one or more marker materials having one or more radiopacities greater than a radiopacity of the first material, distributed over the cord in pattern configured to indicate, in a radiographic image, a condition of the seal.
19. The element of clause 17 or clause 18, wherein the cord has a circular cross-section and the seal is an O-ring.
20. The element of any of clauses 17-19, wherein the cord has a cross-section comprising one of a D cross-section, an X-cross-section, or a rectangular cross-section.
21. The element of any of clauses 17-20, wherein the one or more radiographic markers are located on an outer surface of the cord.
22. The element of any of clauses 17-21, wherein the one or more radiographic markers are at least partially embedded in the first material.
23. The element of any of clauses 17-22, wherein the one or more radiographic markers comprise a radiographic marker extending around a perimeter of the cord, wherein a width of the radiographic marker is less than a thickness of the cord.
24. The element of any of clauses 17-23, wherein the first material comprises silicone, polytetrafluoroethylene (PTFE), a synthetic rubber, a thermoplastic elastomer styrenic, a thermoplastic polyolefin (TPO) low-density polyethylene (LDPE), a TPO high-density polyethylene (HDPE), a TPO linear low-density polyethylene (LLDPE), a TPO ultra low density polyethylene (ULDPE), thermoplastic polyurethane (TPU), thermoplastic polyester, a thermoplastic etheresterelastomer, or a thermoplastic polyamide.
25. The element of any of clauses 17-24, wherein the one or more second materials comprise one of more of particles of one or more metals, nanoparticles of one or more metals, titanium dioxide, bismuth oxide, zirconium oxide, or barium sulfate.
26. A method comprising positioning at least a portion of an assembled article between a radiographic emitter and a radiographic sensor, wherein: the at least the portion of the assembled article comprises an element, according to any of clauses 1-25, contained within the at least the portion of the assembled article.
27. The method of clause 26, comprising generating, based on detection by the sensor of radiographic energy emitted from the radiographic emitter, one or more radiographic images comprising a representation of the one or more radiographic markers that indicates a condition of the element.
28. The method of clause 26 or clause 27, wherein the element comprises a seal.
29. The method of clause 28, wherein the seal comprises a seal body comprising a polymeric first material and one or more radiographic markers having one or more radiopacities greater than a radiopacity of the first material.

30. The method of clause 28 or clause 29, wherein the seal comprises an O-ring.

31. The method of clause 30, wherein the condition comprises rolling.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

The invention claimed is:

1. An O-ring comprising:
a cord comprising a polymeric first material, wherein the cord has a circular cross section and is formed into a continuous loop; and
one or more radiographic markers, comprising one or more second materials having one or more radiopacities greater than a radiopacity of the first material, on a surface of the cord.

2. The O-ring of claim 1, wherein the one or more radiographic markers are in a pattern configured to indicate, based on displacement of one or more portions of the pattern in a radiographic image, a condition of the O-ring.

3. The O-ring of claim 1, wherein the one or more radiographic markers comprise a radiographic marker extending around a perimeter of the cord.

4. The O-ring of claim 1, wherein the one or more radiographic markers comprise a stripe, extending around a perimeter of the cord, having a width less than a thickness of the cord.

5. The O-ring of claim 1, wherein:
an outer face of the cord comprises an outer perimeter that forms an outermost boundary of the cord, an upper face of the cord comprises an upper perimeter that forms an uppermost boundary of the cord, and a lower face of the cord comprises a lower perimeter that forms a lowermost boundary of the cord, and
the one or more radiographic markers are distributed on the outer face and are displaced from the upper perimeter, the outer perimeter, and the lower perimeter.

6. The O-ring of claim 1, wherein:
the cord comprises a plurality of arcuate sections, and
each of the arcuate sections comprises a portion of the one or more radiographic markers that is distinguishable from portions of the one or more radiographic markers located in other arcuate sections.

7. The O-ring of claim 1, wherein the one or more second materials comprise one or more of particles of one or more metals, nanoparticles of one or more metals, titanium dioxide, bismuth oxide, zirconium oxide, or barium sulfate.

8. The O-ring of claim 1, wherein the one or more radiographic markers comprise a plurality of stripes extending along the entire cord.

9. The O-ring of claim 1, wherein:
an outer face of the cord comprises an outer perimeter that forms an outermost boundary of the cord, an upper face of the cord comprises an upper perimeter that forms an uppermost boundary of the cord, and a lower face of the cord comprises a lower perimeter that forms a lowermost boundary of the cord, and
the one or more radiographic markers comprise a first stripe that extends continuously around the outer face and is located between the outer perimeter and the upper perimeter.

10. The O-ring of claim 9, wherein the first stripe is an even-width stripe having a width that is narrower than a thickness of the cord.

11. The O-ring of claim 1, wherein the one or more radiographic markers comprise particles of the one or more second materials bonded to an outer surface of the cord.

12. The O-ring of claim 11, wherein the one or more second materials comprise one or more of particles of: titanium, tungsten, boron, gold, silver, titanium dioxide, bismuth oxide, zirconium oxide, and/or barium sulfate.

13. The O-ring of claim 1, wherein:
an outer face of the cord comprises an outer perimeter that forms an outermost boundary of the cord, an upper face of the cord comprises an upper perimeter that forms an uppermost boundary of the cord, and a lower face of the cord comprises a lower perimeter that forms a lowermost boundary of the cord, and
the one or more radiographic markers comprise: (a) a first stripe that extends continuously around the outer face and is centered above the outer perimeter and (b) a second stripe that extends continuously around the outer face and is centered below the outer perimeter.

14. The O-ring of claim 13, wherein the one or more radiographic markers comprise particles of the one or more second materials bonded to an outer surface of the cord.

15. The O-ring of claim 14, wherein the one or more second materials comprise one or more of particles of: titanium, tungsten, boron, gold, silver, titanium dioxide, bismuth oxide, zirconium oxide, and/or barium sulfate.

16. The O-ring of claim 1, wherein:
an outer face of the cord comprises an outer perimeter that forms an outermost boundary of the cord, an upper face of the cord comprises an upper perimeter that forms an uppermost boundary of the cord, and a lower face of the cord comprises a lower perimeter that forms a lowermost boundary of the cord, and
the one or more radiographic markers comprise: (a) a first stripe that extends continuously around the outer face between the outer perimeter and the upper perimeter and (b) a second stripe that extends continuously around the outer face between the outer perimeter and the lower perimeter.

17. The O-ring of claim 16, wherein the one or more radiographic markers comprise particles of the one or more second materials bonded to an outer surface of the cord.

18. The O-ring of claim 16, wherein the one or more second materials comprise one or more of particles of: titanium, tungsten, boron, gold, silver, titanium dioxide, bismuth oxide, zirconium oxide, and/or barium sulfate.

19. The O-ring of claim 1, wherein:
an outer face of the cord comprises an outer perimeter that forms an outermost boundary of the cord, an upper face of the cord comprises an upper perimeter that forms an uppermost boundary of the cord, and a lower face of the cord comprises a lower perimeter that forms a lowermost boundary of the cord, and
the one or more radiographic markers are located at positions on the surface of the cord such that a portion of the outer face surrounding the outer perimeter lacks any radiographic marker.

20. The O-ring of claim 1, wherein:
an outer face of the cord comprises an outer perimeter that forms an outermost boundary of the cord, and
the one or more radiographic markers are formed: (a) in a first appearance at a first section of the outer face and (b) in a second appearance different from the first appearance at a second section of the outer face.

\* \* \* \* \*